United States Patent
Felicitas et al.

(10) Patent No.: US 6,883,514 B1
(45) Date of Patent: Apr. 26, 2005

(54) BARBEQUE GRILL

(76) Inventors: Adonis O Felicitas, 892 Gallatin Dr. #9, Santa Clara, CA (US) 95051; Crispina M. Felicitas, 892 Gallatin Dr. #9, Santa Clara, CA (US) 95051

( * ) Notice: Subject to any disclaimer, the term of this patent is extended or adjusted under 35 U.S.C. 154(b) by 0 days.

(21) Appl. No.: 10/808,712

(22) Filed: Mar. 25, 2004

(51) Int. Cl.⁷ .............................................. A47J 37/00
(52) U.S. Cl. .................... 126/25 R; 126/9 R; 126/276; 99/389; 99/446
(58) Field of Search .......................... 126/25 R, 25 A, 126/41 R, 41 A, 41 B, 276, 9 R, 19 R; 99/389–392, 99/340, 400, 401, 444, 446, 450

(56) References Cited

U.S. PATENT DOCUMENTS

| | | | |
|---|---|---|---|
| 1,836,894 A | * | 12/1931 | Bedigian ...................... 126/29 |
| D155,631 S | | 10/1949 | Roedter |
| 3,324,788 A | * | 6/1967 | La France .................... 99/389 |
| 3,742,838 A | * | 7/1973 | Luschen et al. .............. 99/389 |
| D262,348 S | | 12/1981 | Levy |
| 4,850,333 A | * | 7/1989 | Dellrud et al. ............. 126/25 A |
| 5,655,437 A | | 8/1997 | Vitacca |
| 5,823,174 A | | 10/1998 | Andress |
| 5,836,295 A | * | 11/1998 | Faraj ........................ 126/25 R |
| 6,000,388 A | | 12/1999 | Andress |
| 6,182,560 B1 | | 2/2001 | Andress |

* cited by examiner

*Primary Examiner*—James C. Young

(57) ABSTRACT

A barbeque grill includes a base member having a bottom surface and a plurality of sidewalls integral therewith. The base member includes a plurality of spaced support rails slidably engageable with the bottom surface. A plurality of elongated support legs are connected to the plurality of support rails respectively. A pair of opposed side panels having top and bottom edge portions are secured to the plurality of support legs. The grill further includes a top member pivotally connected to one of the side panels. The top member includes a grill surface for supporting foodstuff thereon. A plurality of baskets are disposed substantially medially between the base member and the top member. The grill further includes a drip pan for collecting and directing grease downwardly and away from the plurality of baskets.

20 Claims, 3 Drawing Sheets

BARBEQUE GRILL

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to outdoor cooking devices and, more particularly, to a barbeque grill.

2. Prior Art

Conventional barbecue-type grilling devices typically include a horizontally disposed grill which is placed directly above the burning coals, or the source of heat used for cooking. As the food cooks, grease and fat drippings from the meat may burst into flames upon contact with the heat source, giving off fumes which may burn or impair the taste of the food. Oftentimes, the liquid dripping from the meat may cause a flame to singe or burn the meat which deposits carbon on the meat. Consumption of such charred meat is known to contribute to the development of cancer in humans over time.

Accordingly, a need remains for a grill that prevents grease drippings from dropping on the heat source and to prevent flames from erupting and charring the food.

BRIEF SUMMARY OF THE INVENTION

In view of the foregoing background, it is therefore an object of the present invention to provide an apparatus for outdoor cooking. These and other objects, features, and advantages of the invention are provided by a barbeque grill including a base member having a longitudinal axis and a substantially planar bottom surface. The base member further has a plurality of sidewalls integral therewith and extending substantially vertically therefrom. The base member includes a plurality of spaced support rails slidably engageable with the bottom surface and for guiding the base member between retracted and extended positions substantially parallel to the axis.

The grill further includes a plurality of elongated support legs connected to the plurality of support rails respectively and extending substantially vertically adjacent to the base member. A pair of opposed side panels having top and bottom edge portions are secured to the plurality of support legs. The side panels extend substantially parallel to the plurality of support legs along a vertical plane and define a cavity therebetween.

The grill further includes a top member having front and rear edge portions positioned along a length of the top edge portions respectively and extending across the cavity. The rear edge portion is pivotally connected to one of the side panels so that the top member can be selectively moved between open and closed positions. The top member further includes a lid pivotally connected thereto and for selectively covering the grill surface during cooking operations. The lid includes a handle connected thereto and for assisting a user to selectively pivot the lid between open and closed positions. The top member further includes a grill surface for supporting foodstuff thereon and being spaced above the cavity.

The grill further includes a plurality of baskets for storing charcoal therein. The plurality of baskets have a generally rectangular shape and extend adjacent a length of the side panels. The baskets are disposed substantially medially between the base member and the top member and extend substantially parallel to the axis.

The grill further includes a drip pan having a substantially V-shaped cross-section for collecting and directing grease downwardly and away from the plurality of baskets. The drip pan has opposed edge portions and a central portion converging medially and downwardly therefrom and rear and front portions offset above and below the axis respectively. The drip pan is disposed substantially medially of the plurality of baskets and is engaged therewith respectively.

The grill further includes a reservoir having a substantially cylindrical shape and is removably positionable on the bottom surface of the base member for receiving grease drippings directed downwardly and away from the drip pan. A plurality of access doors are pivotally connected to the side panels respectively and extend along a partial length thereof and substantially parallel to the axis. The plurality of access doors are disposed adjacent the plurality of baskets and are movable between open and closed positions so that a user can effectively access the cavity. The plurality of access doors are selectively pivotal within a select quadrant respectively. The grill further includes a plurality of wheels pivotally secured to the plurality of support legs respectively and for allowing the barbecue grill to be rolled along a ground surface.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures.

Figure 1:
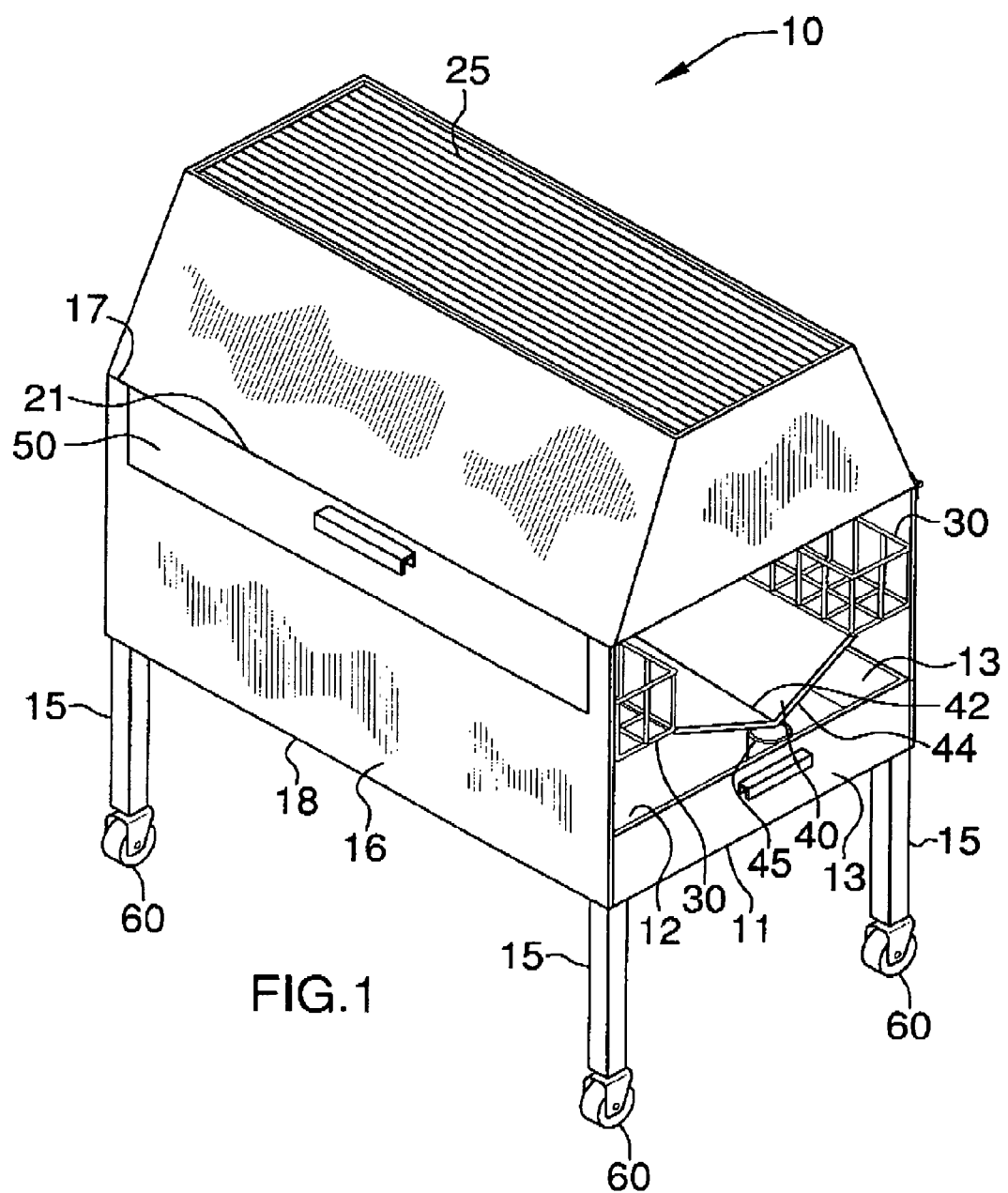
FIG. 1 is a perspective view showing a barbeque grill without a lid, in accordance with the present invention.
Figure 2:
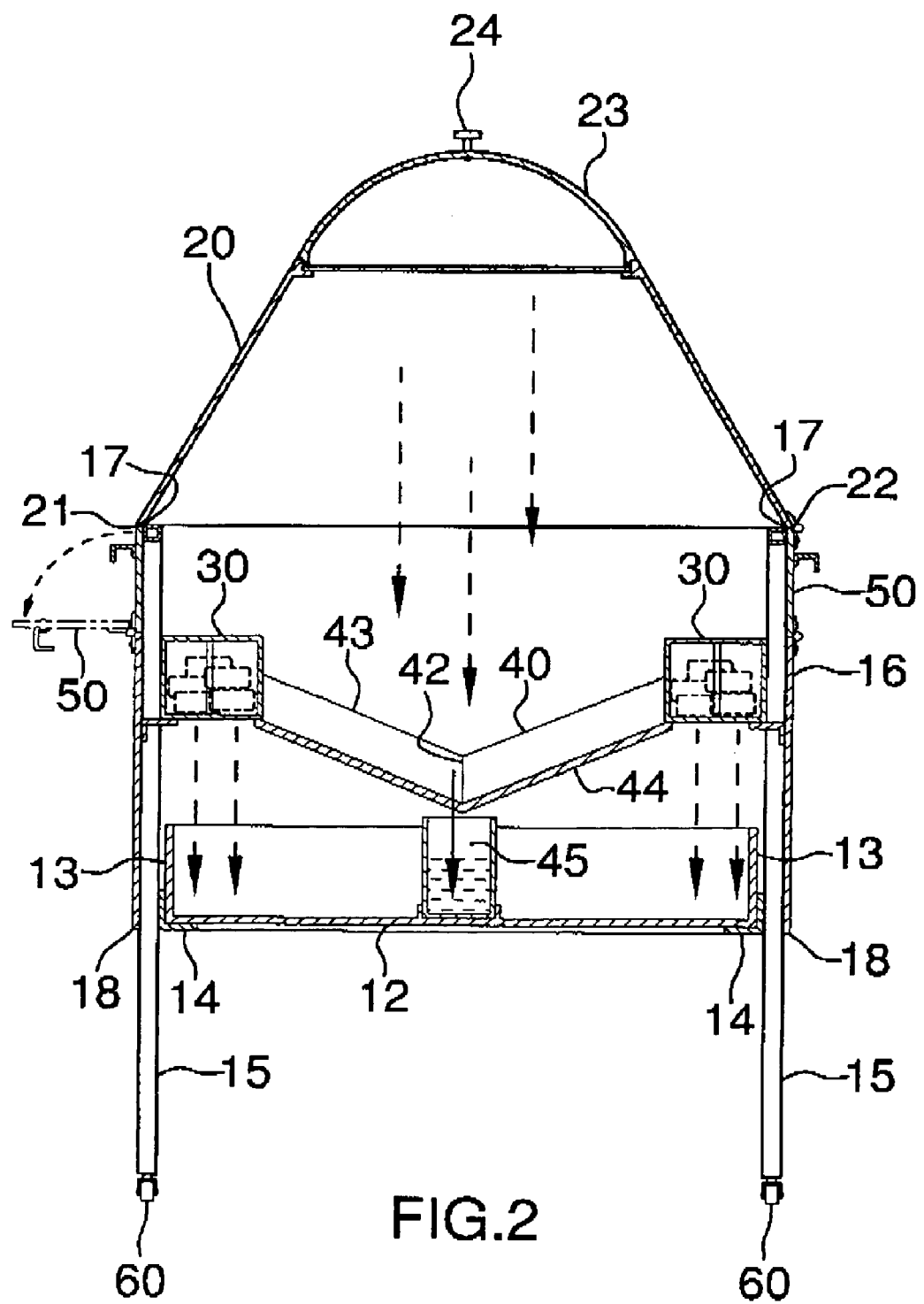
FIG. 2 is a cross-sectional view of the barbeque grill shown in FIG. 1 with a lid added thereto, taken along line 2—2.
Figure 3:
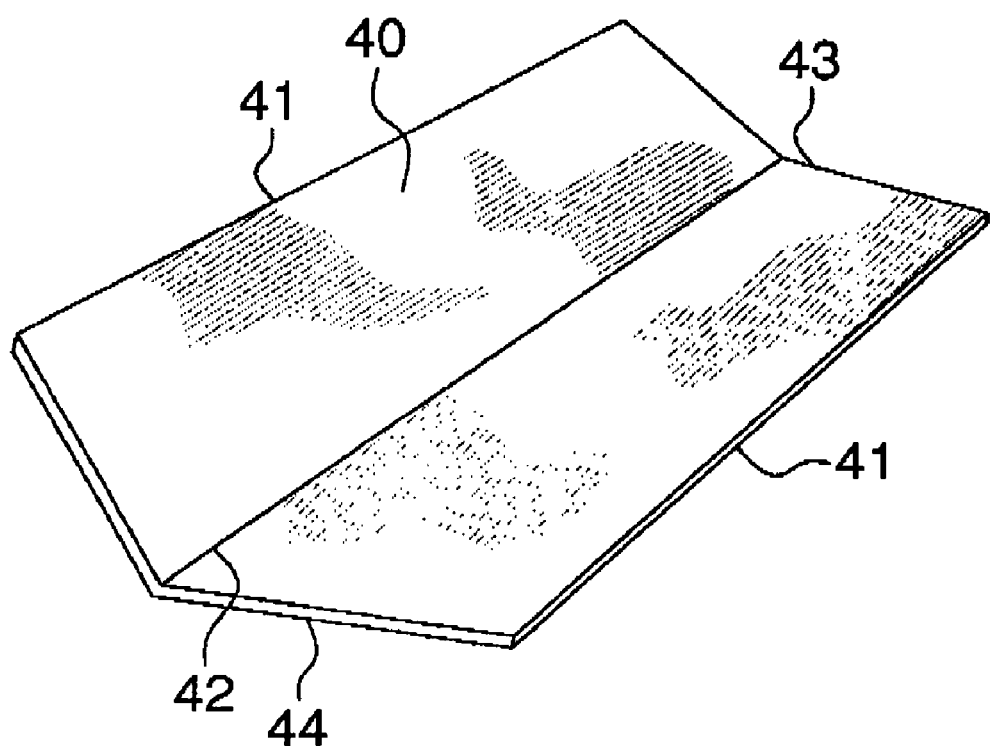
FIG. 3 is a perspective view of the drip pan.

The apparatus of this invention is referred to generally in FIGS. 1–3 by the reference numeral 10 and is intended to provide a barbeque grill for outdoor cooking. It should be understood that the grill 10 may be used to cook many different types of foodstuffs.

Initially referring to FIG. 1, the grill 10 includes a base member 11 having a longitudinal axis (not shown) and a substantially planar bottom surface 12. The base member 11 further has a plurality of sidewalls 13 integral therewith and extending substantially vertically therefrom. The base member 11 includes a plurality of spaced support rails 14 slidably engageable with the bottom surface 12 and for guiding the base member 11 between retracted and extended positions substantially parallel to the axis, as best shown in FIG. 2. Advantageously, a user is able to easily extend the base member and easily clean ashes, coals, and other debris after grilling.

Now referring to FIGS. 1 and 2, the grill 10 further includes a plurality of elongated support legs 15 connected to the plurality of support rails 14 respectively and extending substantially vertically adjacent to the base member 11. A pair of opposed side panels 16 having top 17 and bottom 18 edge portions are secured to the plurality of support legs 15. The side panels 16 extend substantially parallel to the plurality of support legs 15 along a vertical plane and define a cavity therebetween.

The grill 10 further includes a top member 20 having front 21 and rear 22 edge portions positioned along a length of the top edge portions 17 respectively and extending across the cavity. The rear edge portion 22 is pivotally connected to one of the side panels 16 so that the top member 20 can be selectively moved between open and closed positions, as best shown in FIG. 2.

In an alternate embodiment, the top member 20 further includes a lid 23 pivotally connected thereto and for selectively covering the grill surface during cooking operations. The lid 23 includes a handle 24 connected thereto and for assisting a user to selectively pivot the lid 23 between open and closed positions, as best shown in FIG. 2. The top member 20 further includes a grill surface 25 for supporting foodstuff thereon and being spaced above the cavity.

Still referring to FIGS. 1 and 2, the grill 10 further includes a plurality of baskets 30 for storing charcoal therein. This allows a user to selectively add charcoal as needed during operating conditions. The plurality of baskets 30 have a generally rectangular shape and extend adjacent a length of the side panels 16. The baskets 30 are disposed substantially medially between the base member 11 and the top member 20 and extend substantially parallel to the axis.

The grill 10 further includes a drip pan 40 having a substantially V-shaped cross-section for collecting and directing grease downwardly and away from the plurality of baskets 30, as best shown in FIG. 3. The drip pan 40 has opposed edge portions 41 and a central portion 42 converging medially and downwardly therefrom and rear 43 and front 44 portions offset above and below the axis respectively. Advantageously, any grease dripping from the grill 10 will fall on the drip pan 40 and be directed away from a heat source so that it will not erupt in flames. The drip pan 40 is disposed substantially medially of the plurality of baskets 30 and is engaged therewith respectively.

The grill 10 further includes a reservoir 45 having a substantially cylindrical shape removably positionable on the bottom surface 12 of the base member 11 for receiving grease drippings directed downwardly and away from the drip pan 40. When the reservoir is full, a user can easily remove it from the base member 11 and dispose of its contents. A plurality of access doors 50 are pivotally connected to the side panels 16 respectively and extend along a partial length thereof and substantially parallel to the axis.

The plurality of access doors 50 are disposed adjacent the plurality of baskets 30 and are movable between open and closed positions so that a user can effectively access the cavity in order to replenish the charcoal supply. The plurality of access doors 50 are selectively pivotal within a select quadrant respectively. The grill 10 further includes a plurality of wheels 60 pivotally secured to the plurality of support legs 15 respectively and for allowing the barbecue grill to be rolled along a ground surface.

The grill 10 features a wide range of benefits including less smoke and fewer flare-ups than standard grills so that food can be cooked gradually. As a result, the grill 10 eliminates the uncontrolled fires that frequently occur when hot grease drips onto hot charcoal. This allows heat and smoke to penetrate foods without scorching or burning expensive meats, enhancing their flavor and texture. In addition, charcoal is easily added through the access doors in the event more charcoal is needed during operating conditions. The base member 11 can be easily removed for easy clean-up without disassembling the grill.

The grill 10 would be welcomed as a safe, simple to clean, and easy to use durable grill by users who enjoy barbecuing, camping and picnicking. The portable design allows the grill 10 to be transported to social events, tailgate parties and cookouts.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A barbeque grill for outdoor cooking comprising:
    a base member having a longitudinal axis and a substantially planar bottom surface, said base member further having a plurality of sidewalls integral therewith and extending substantially vertically therefrom, said base member including a plurality of spaced support rails slidably engageable with said bottom surface and for guiding said base member between retracted and extended positions substantially parallel to the axis;
    a plurality of elongated support legs connected to said plurality of support rails respectively and extending substantially vertically adjacent to said base member;
    a pair of opposed side panels having top and bottom edge portions and being secured to said plurality of support legs, said side panels extending substantially parallel to said plurality of support legs along a vertical plane and defining a cavity therebetween;
    a top member having front and rear edge portions positioned along a length of said top edge portions respectively and extending across the cavity, said rear edge portion being pivotally connected to one said side panels so that said top member can be selectively moved between open and closed positions, said top member including a grill surface for supporting foodstuff thereon and being spaced above said cavity;

a plurality of baskets for storing charcoal therein, said plurality of baskets having a generally rectangular shape and extending adjacent a length of said side panels, said baskets being disposed substantially medially between said base member and said top member and extending substantially parallel to the axis;

a drip pan for collecting and directing grease downwardly and away from said plurality of baskets, said drip pan having opposed edge portions and a central portion converging medially and downwardly therefrom;

a reservoir removably positionable on said bottom surface of said base member, said reservoir for receiving grease drippings directed downwardly and away from said drip pan; and a plurality of access doors pivotally connected to said side panels respectively and extending along a partial length thereof and substantially parallel to the axis, said plurality of access doors being disposed adjacent said plurality of baskets and being movable between open and closed positions so that a user can effectively access the cavity.

2. The barbecue grill of claim 1, further comprising: a plurality of wheels pivotally secured to said plurality of support legs respectively and for allowing said barbecue grill to be rolled along a ground surface.

3. The barbeque grill of claim 1, wherein said top member further comprises: a lid pivotally connected thereto and for selectively covering said grill surface during cooking operations.

4. The barbeque grill of claim 1, wherein said drip pan has rear and front portions offset above and below the axis respectively.

5. The barbeque grill of claim 1, wherein said drip pan is disposed substantially medially of said plurality of baskets and is engaged therewith respectively.

6. The barbeque grill of claim 3, wherein said lid comprises: a handle connected thereto and for assisting a user to selectively pivot said lid between open and closed positions.

7. The barbeque grill of claim 1, wherein said drip pan has a generally V-shape cross-section.

8. The barbeque grill of claim 1, wherein said reservoir has a substantially cylindrical shape.

9. The barbeque grill of claim 1, wherein said plurality of access doors are selectively pivotal within a select quadrant respectively.

10. A barbeque grill for outdoor cooking comprising:
a base member having a longitudinal axis and a substantially planar bottom surface, said base member further having a plurality of sidewalls integral therewith and extending substantially vertically therefrom, said base member including a plurality of spaced support rails slidably engageable with said bottom surface and for guiding said base member between retracted and extended positions substantially parallel to the axis;

a plurality of elongated support legs connected to said plurality of support rails respectively and extending substantially vertically adjacent to said base member;

a plurality of wheels pivotally secured to said plurality of support legs respectively and for allowing said barbecue grill to be rolled along a ground surface;

a pair of opposed side panels having top and bottom edge portions and being secured to said plurality of support legs, said side panels extending substantially parallel to said plurality of support legs along a vertical plane and defining a cavity therebetween;

a top member having front and rear edge portions positioned along a length of said top edge portions respectively and extending across the cavity, said rear edge portion being pivotally connected to one said side panels so that said top member can be selectively moved between open and closed positions, said top member including a grill surface for supporting foodstuff thereon and being spaced above said cavity;

a plurality of baskets for storing charcoal therein, said plurality of baskets having a generally rectangular shape and extending adjacent a length of said side panels, said baskets being disposed substantially medially between said base member and said top member and extending substantially parallel to the axis;

a drip pan for collecting and directing grease downwardly and away from said plurality of baskets, said drip pan having opposed edge portions and a central portion converging medially and downwardly therefrom;

a reservoir removably positionable on said bottom surface of said base member, said reservoir for receiving grease drippings directed downwardly and away from said drip pan; and a plurality of access doors pivotally connected to said side panels respectively and extending along a partial length thereof and substantially parallel to the axis, said plurality of access doors being disposed adjacent said plurality of baskets and being movable between open and closed positions so that a user can effectively access the cavity.

11. The barbeque grill of claim 10, wherein said top member further comprises: a lid pivotally connected thereto and for selectively covering said grill surface during cooking operations.

12. The barbeque grill of claim 10, wherein said drip pan has rear and front portions offset above and below the axis respectively.

13. The barbeque grill of claim 10, wherein said drip pan is disposed substantially medially of said plurality of baskets and is engaged therewith respectively.

14. The barbeque grill of claim 11, wherein said lid comprises: a handle connected thereto and for assisting a user to selectively pivot said lid between open and closed positions.

15. The barbeque grill of claim 10, wherein said drip pan has a generally V-shaped cross-section.

16. The barbeque grill of claim 10, wherein said reservoir has a substantially cylindrical shape.

17. The barbeque grill of claim 10, wherein said plurality of access doors are selectively pivotal within a select quadrant respectively.

18. A barbeque grill for outdoor cooking comprising:
a base member having a longitudinal axis and a substantially planar bottom surface, said base member further having a plurality of sidewalls integral therewith and extending substantially vertically therefrom, said base member including a plurality of spaced support rails slidably engageable with said bottom surface and for guiding said base member between retracted and extended positions substantially parallel to the axis;

a plurality of elongated support legs connected to said plurality of support rails respectively and extending substantially vertically adjacent to said base member;

a plurality of wheels pivotally secured to said plurality of support legs respectively and for allowing said barbecue grill to be rolled along a ground surface;

a pair of opposed side panels having top and bottom edge portions and being secured to said plurality of support legs, said side panels extending substantially parallel to said plurality of support legs along a vertical plane and defining a cavity therebetween;

a top member having front and rear edge portions positioned along a length of said top edge portions respectively and extending across the cavity, said rear edge portion being pivotally connected to one said side panels so that said top member can be selectively moved between open and closed positions, said top member including a grill surface for supporting foodstuff thereon and being spaced above said cavity;

a plurality of baskets for storing charcoal therein, said plurality of baskets having a generally rectangular shape and extending adjacent a length of said side panels, said baskets being disposed substantially medially between said base member and said top member and extending substantially parallel to the axis;

a drip pan for collecting and directing grease downwardly and away from said plurality of baskets, said drip pan having opposed edge portions and a central portion converging medially and downwardly therefrom, said drip pan having rear and front portions offset above and below the axis respectively;

a reservoir removably positionable on said bottom surface of said base member, said reservoir for receiving grease drippings directed downwardly and away from said drip pan; and a plurality of access doors pivotally connected to said side panels respectively and extending along a partial length thereof and substantially parallel to the axis, said plurality of access doors being disposed adjacent said plurality of baskets and being movable between open and closed positions so that a user can effectively access the cavity.

19. The barbeque grill of claim 18, wherein said top member further comprises: a lid pivotally connected thereto and for selectively covering said grill surface during cooking operations.

20. The barbeque grill of claim 18, wherein said drip pan is disposed substantially medially of said plurality of baskets and is engaged therewith respectively.

* * * * *